Jan. 13, 1942.     C. R. SCHENK     2,269,788
TRANSMISSION UNIT
Filed April 5, 1940     2 Sheets-Sheet 2
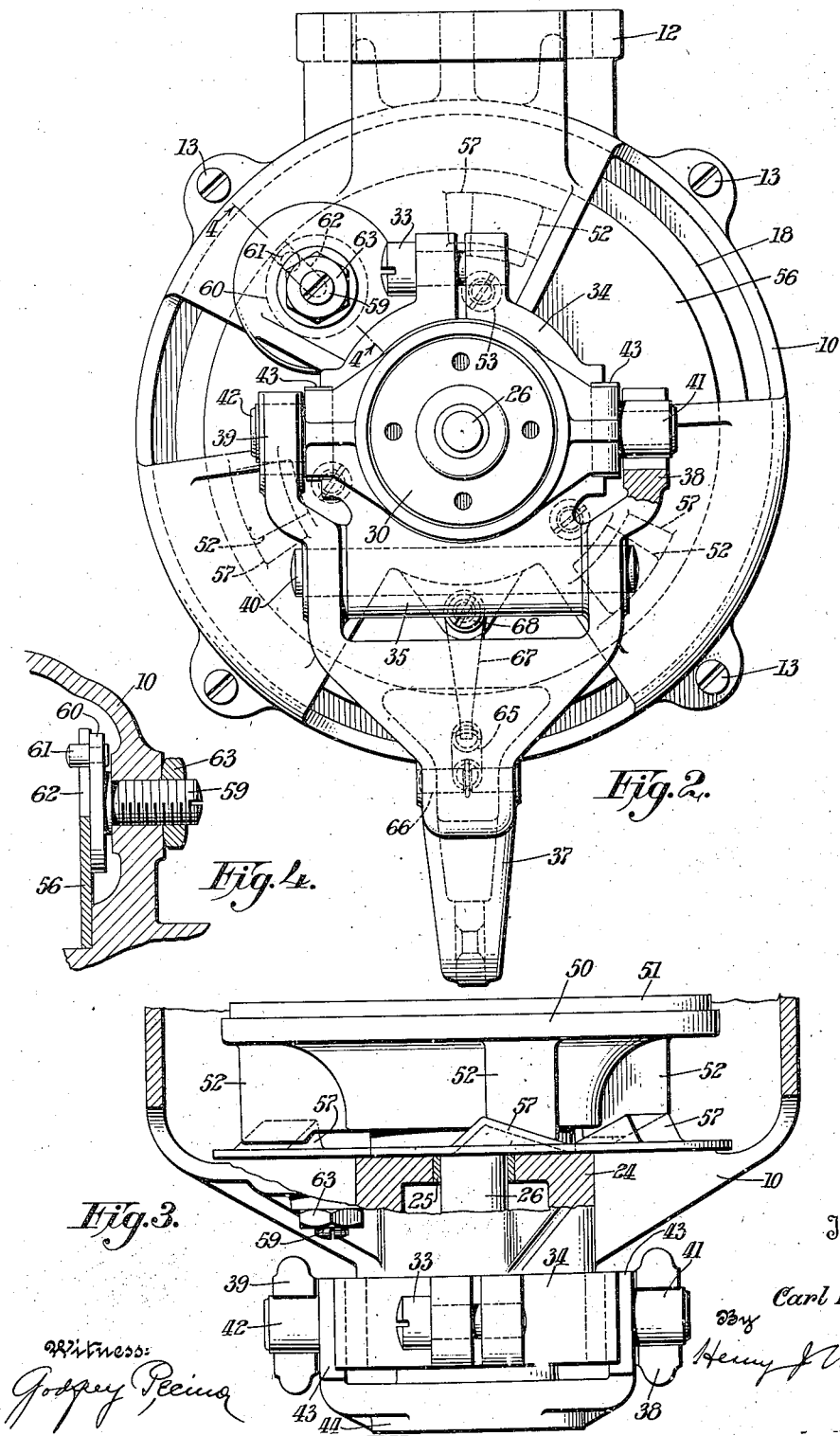

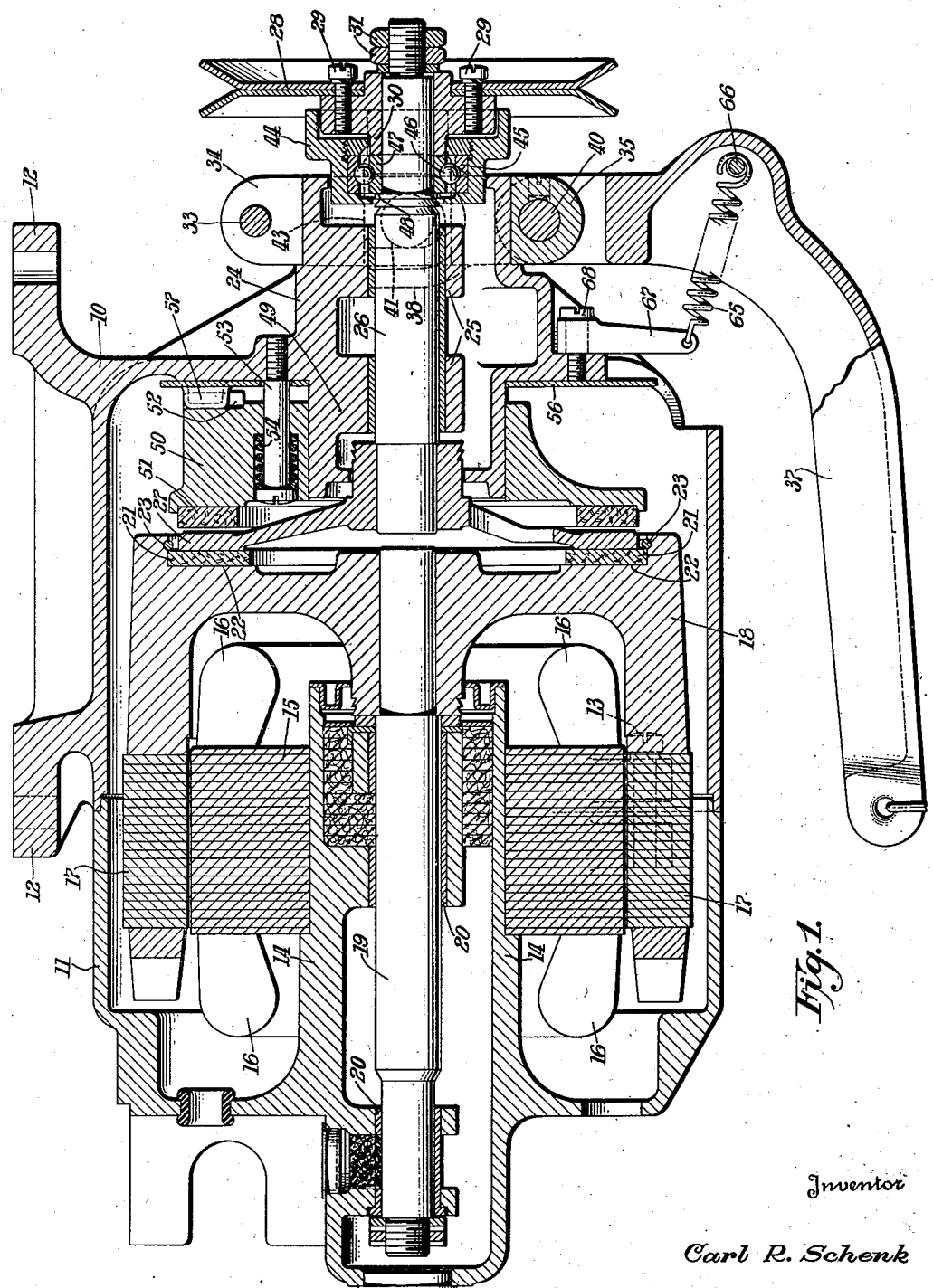

Patented Jan. 13, 1942

2,269,788

UNITED STATES PATENT OFFICE 2,269,788

TRANSMISSION UNIT

Carl R. Schenk, Jersey City, N. J., assignor to The Singer Manufacturing Company, Elizabeth, N. J., a corporation of New Jersey Application April 5, 1940, Serial No. 328,034

3 Claims. (Cl. 192—18)

This invention relates to a unitary electric motor and power-transmitter device adapted more particularly for use in garment manufacturing establishments as individual sewing machine drivers, each sewing machine having its own individual motor and transmission unit.

The object of this invention is to provide improved means for adjusting the brake-element relative to the driven element by a single means which is located in a readily accessible position on the outside of the transmitter casing.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the drawings,

Fig. 1 is a vertical section taken through the center of the transmitter unit.

Fig. 2 is a right end elevation with the pulley removed.

Fig. 3 is a top plan view, partly in section, of the right end of the transmitter shown in section 1.

Fig. 4 is a detailed sectional view taken along the line 4—4 of Fig. 2.

In the embodiment of this invention, selected for illustration, the transmitter unit comprises a casing formed in two parts 10 and 11, the part 11 being formed with feet 12 which are adapted to be secured to the under side of a table or the like. The parts 10 and 11 are held together by means of the screws 13 and between them form a hollow cylindrical casing which houses the electric motor, clutch and brake mechanism. The part 11 of the casing is formed with inwardly extending central tubular portion 14 on which is tightly fitted a stationary electromagnetic element 15 having the usual four-pole three-phase winding 16.

The rotary electro-magnetic member of the motor is disposed externally of the stationary member 15 and comprises the ordinary ring type squirrel-cage rotor 17 which is secured to a spider 18 rigidly fixed to one end of a shaft 19 journaled in suitable bearings 20 carried by the tubular portion 14. The external rotor 17 and spider 18 are, in effect, a flywheel and the spider 18 carries a friction-disk 21 which may be held in the depression 22 in the spider by any suitable means herein shown as a split-ring 23.

The part 10 of the casing is formed with a hub portion 24 having bearings 25 in which are journaled, for rotary and endwise movement, a stub-shaft 26. The shaft 26 has fixed to one of its ends a driven clutch-element or disk 27 and mounted on its other end is a driving pulley 28 secured by screws 29 to a hub 30 which is held on the shaft by means of the nuts 31.

Clamped to the outer cylindrical surface of the hub 24 by the screw 33 is a collar 34 formed with a depending portion 35. An actuating lever 37 is bifurcated to form two arms 38, 39 which receive the depending portion 35 and are pivoted thereto by means of the pin 40. The arms 38 and 39 extend upwardly and are slotted at their free ends to receive the trunnions 41 and 42 carried by the backwardly extending arms 43 formed on the cylindrically shaped member 44. Carried by the member 44 is the outer race 45 of a ball bearing 46 and the inner race 47 of the ball bearing embraces the shaft 26 and is held thereon between a shoulder 48 on the shaft and the hub 30.

From the foregoing it will be observed that when the actuating lever 37 is shifted about its pivot 40 the upper ends 38 and 39 of the lever, through the trunnion connections 41 and 42, shift the member 44 laterally and this lateral movement of the member 44 through the ball bearing 46 causes the stub-shaft 26 to move endwise in its bearings.

The part 10 is also formed with an inwardly extending hub portion 49 on which is mounted a circular brake-member 50 carrying a friction brake-ring 51 on one face which is adapted to be engaged by the driven element 27. The other face of the brake-member 50 is formed with a series of wedge-shaped projections 52. The brake-member 50 is prevented from turning on the hub by means of a screw 53 which extends through a suitable opening in the member 50. A spring 54 is provided which reacts against the head of the screw and the brake-member to constantly urge the brake-member away from the driven element 27 of the clutch. Mounted for turning movement on the cylindrical portion 49 is an adjusting disk 56 formed with a series of wedge-shaped projections 57 which are adapted to cooperate with the projections 52 on the brake-member 50 to force the brake-member 50 towards the driven element 27. In order to turn the disk 56 for the purpose of adjusting the brake-member 50 relative to the driving element, the part 10 of the casing is formed with a threaded aperture which is adapted to receive a screw 59 which carries a disk 60 provided with a pin 61 which enters a U-shaped slot 62 in the disk 56, a lock-nut 63 being provided for the purpose of locking the screw 59 in its adjusted position. From the above it will be understood that the lock-nut 63 may be released and the screw 59 turned. Turning of the screw will cause the stud 61 to turn the adjusting disk 56 relative to the brake-member 50 and the wedge-shaped projections 57 and 52 will slide over each other and force the brake-member 50 to slide on the hub 49 towards the driven element and against the action of the spring 54.

In order to constantly urge the driven element 27 into engagement with the brake-element there is provided a tension-spring 65 which has one of its ends secured to a pin 66 carried by the actuating lever 37 and its other end secured to one end of a lever 67 secured by the screw 68 to the part 10 of the transmitter casing.

From the foregoing description it will be observed that the brake friction ring may be readily and quickly adjusted towards the driving element for the purpose of compensating for wear of the friction elements. Further, the angular relationship between the driven element and the brake is not disturbed due to the fact that all points on the brake-element advance towards the driven element in a right line.

Having thus set forth the nature of the invention what I claim herein is:

1. In an electric transmitter, a casing, an electric motor located in one end of the casing, a driving element within the casing and actuated by said motor, an interiorly arranged hub formed on the casing and located in the end opposite the motor, a brake-element carried by said hub and constrained to slide on said hub in a right line, a shaft journaled in said hub, a driven element fixed to said shaft and disposed between the driving element and the brake-element, and means for sliding said brake-element on said hub towards the driven element for the purpose of adjusting said brake-element relative to the driving element.

2. In an electric transmitter, a casing, an electric motor located in one end of the casing, a driving element within the casing and actuated by said motor, an interiorly arranged hub formed on the casing and located in the end opposite the motor, a brake-element carried by said hub and constrained to slide on said hub in a right line, a shaft journaled in said hub, a driven element fixed to said shaft and disposed between the driving element and the brake-element, a rotatable plate mounted on said hub, said plate being provided with projections which engage said brake-member, and a single means for changing the angular position of said plate-member to cause the projections on said plate-member to move the brake-element towards the driving element.

3. In an electric transmitter, a casing, an electric motor located in one end of the casing, a driving element within the casing and actuated by said motor, an interiorly arranged hub formed on the casing and located in the end opposite the motor, a brake-element carried by said hub and constrained to slide on said hub in a right line, a shaft journaled in said hub, a driven element disposed between the driving element and the brake-element, said driven element being fixed to said shaft, wedge-shaped projections formed on said brake-element, a circular plate mounted on said hub and formed with wedge-shaped projections corresponding to the projections on said brake-element, and a single means for changing the angular position of said plate to cause the wedge-shaped projections to move said brake-element towards said driven element.

CARL R. SCHENK.